US010295998B2

(12) United States Patent
Yokoyama

(10) Patent No.: US 10,295,998 B2
(45) Date of Patent: May 21, 2019

(54) AGRICULTURAL WORK VEHICLE

(71) Applicant: YANMAR CO., LTD., Osaka-shi, Osaka (JP)

(72) Inventor: Kazuhisa Yokoyama, Osaka (JP)

(73) Assignee: YANMAR CO., LTD., Osaka (JP)

( * ) Notice: Subject to any disclaimer, the term of this patent is extended or adjusted under 35 U.S.C. 154(b) by 10 days.

(21) Appl. No.: 15/525,822

(22) PCT Filed: Nov. 10, 2015

(86) PCT No.: PCT/JP2015/081544
§ 371 (c)(1),
(2) Date: May 10, 2017

(87) PCT Pub. No.: WO2016/076289
PCT Pub. Date: May 19, 2016

(65) Prior Publication Data
US 2017/0322550 A1 Nov. 9, 2017

(30) Foreign Application Priority Data

Nov. 13, 2014 (JP) ................... 2014-231125
Nov. 13, 2014 (JP) ................... 2014-231126
Nov. 13, 2014 (JP) ................... 2014-231127

(51) Int. Cl.
*G05D 1/00* (2006.01)
*A01B 69/04* (2006.01)
(Continued)

(52) U.S. Cl.
CPC .......... *G05D 1/0016* (2013.01); *A01B 63/02* (2013.01); *A01B 63/111* (2013.01); *A01B 69/00* (2013.01);
(Continued)

(58) Field of Classification Search
None
See application file for complete search history.

(56) References Cited

U.S. PATENT DOCUMENTS 6,148,255 A 11/2000 Van Der Lely
8,849,521 B2 9/2014 Ishikawa
(Continued)

FOREIGN PATENT DOCUMENTS

JP H09037632 A 2/1997
JP H11148857 2/1999
(Continued)

OTHER PUBLICATIONS

International Search Report corresponding to Application No. PCT/JP2015/081544 dated Feb. 16, 2016.
(Continued)

*Primary Examiner* — Lail A Kleinman
(74) *Attorney, Agent, or Firm* — Norton Rose Fulbright US LLP

(57) ABSTRACT

An agricultural work vehicle capable of communicating with a host computer and capable of being steered by a remote control device so as to enable the agricultural work vehicle to link with the host computer and perform in an optimum work form, wherein the agricultural work vehicle is provided with a position calculation means measuring the position of the machine body, a steering actuator operating a steering device, a shifting means, and a control device controlling them. An optimum working speed and an optimum work driving value calculated from past and current weather information, field information, work information, work machine information, and crop information are transmitted from the host computer to the control device. The
(Continued)

agricultural work vehicle is controlled and caused to work at the optimum working speed and the optimum work driving value along a set travel path.

13 Claims, 12 Drawing Sheets

(51) Int. Cl.
- *G01S 19/42* (2010.01)
- *A01B 79/00* (2006.01)
- *A01B 63/02* (2006.01)
- *A01B 63/111* (2006.01)
- *G05D 1/02* (2006.01)
- *A01B 69/00* (2006.01)

(52) U.S. Cl.
CPC .......... *A01B 69/008* (2013.01); *A01B 79/005* (2013.01); *G01S 19/42* (2013.01); *G05D 1/00* (2013.01); *G05D 1/0022* (2013.01); *G05D 1/02* (2013.01); *G05D 2201/0201* (2013.01)

(56) References Cited

U.S. PATENT DOCUMENTS

| | | | |
|---|---|---|---|
| 8,909,440 | B2 | 12/2014 | Ishikawa |
| 9,164,513 | B2 | 10/2015 | Matsuzaki |
| 2002/0165649 | A1 | 11/2002 | Wilhelm et al. |
| 2009/0222160 | A1* | 9/2009 | Morselli .............. A01B 69/007 701/25 |
| 2012/0046822 | A1* | 2/2012 | Anderson .......... G01C 21/3492 701/29.1 |
| 2012/0239260 | A1 | 9/2012 | Ishikawa |
| 2012/0323474 | A1* | 12/2012 | Breed .................. B60W 30/04 701/117 |
| 2014/0277899 | A1 | 9/2014 | Matsuzaki et al. |
| 2014/0277968 | A1 | 9/2014 | Ishikawa |
| 2015/0105965 | A1* | 4/2015 | Blackwell ............ A01B 59/002 701/28 |
| 2015/0134221 | A1* | 5/2015 | Pelletier ............... B62D 11/003 701/87 |

FOREIGN PATENT DOCUMENTS

| | | |
|---|---|---|
| JP | H1189351 A | 4/1999 |
| JP | H11249741 A | 9/1999 |
| JP | 2001169605 A | 6/2001 |
| JP | 2001507843 A | 6/2001 |
| JP | 2002034308 A | 2/2002 |
| JP | 2003316437 A | 11/2003 |
| JP | 4001933 B2 | 10/2007 |
| JP | 2008146425 A | 6/2008 |
| JP | 2010136700 A | 6/2010 |
| JP | 2010282568 A | 12/2010 |
| JP | 2012044953 A | 3/2012 |
| JP | 2012191857 A | 10/2012 |
| JP | 2012223847 A | 11/2012 |
| JP | 2014178759 A | 9/2014 |

OTHER PUBLICATIONS

Notification of Reasons for Refusal corresponding to Application No. 2014-231126; dated Dec. 19, 2017.

Extended European Search Report corresponding to Application No. 15858482.1-1802; dated Nov. 29, 2017.

Notice of Reasons for Rejection for corresponding JP Patent Application No. 2014-231126; dated Sep. 12, 2017.

Notification of Reasons for Refusal for corresponding to JP Application No. 2014-231125; dated Feb. 27, 2018.

\* cited by examiner

AGRICULTURAL WORK VEHICLE

CROSS REFERENCE TO RELATED APPLICATIONS

This is the U.S. national stage of application No. PCT/JP2015/081544, filed Nov. 10, 2015. Priority under 35 U.S.C. § 119(a) and 35 U.S.C. § 365(b) is claimed from Japanese Application No. 2014-231125, filed Nov. 13, 2014, Japanese Application No. 2014-231126, filed Nov. 13, 2014 and Japanese Application No. 2014-231127, filed Nov. 13, 2014, the disclosures of which are also incorporated herein by reference.

TECHNICAL FIELD

The present invention relates to a control device of an agricultural work vehicle and an art in which a host computer is communicable and the host computer calculates optimum work from weather information and work information, the optimum work is transmitted to the agricultural work vehicle, and the agricultural work vehicle is controlled so as to work.

BACKGROUND ART

Conventionally, an art in which machine repair information, machine performance information, farm product growth information, work information, weather information, map information and the like are stored as a database in a host control part and can be transmitted from and to a tractor via a communication circuit, and the tractor can be operated manually or automatically is known (for example, see the Patent Literature 1).

PRIOR ART REFERENCE

Patent Literature

Patent Literature 1: the Japanese Patent Laid Open Gazette 2002-34308

DISCLOSURE OF INVENTION

Problems to be Solved by the Invention

In the above art, the data stored as the database is past data. For example, the weather information is past precipitation, amount of sunshine, temperature and the like, and land information is hardness of soil and the like. Hardness of the field is assumed based on the data. As large as viscosity of soil of the field is assumed to be, as large as amount or speed of rises of a work machine is.

However, the past information may differ from the actual hardness of the field, and when actual tilting work is adjusted to past track record, the tilting is deep and load is large so as to worsen work efficiency. Since the work is performed so as to reproduce a past work state with sufficient track record on the assumption of fine weather, in the case of work after rain, the work is performed without any measure against rain and yield may be reduced.

The present invention is provided in consideration of the conditions as mentioned above, and at the time of work, a host computer reads out actual state of the field and weather information on real time and calculate optimum work mode, and an agricultural work vehicle is controlled so as to execute the optimum work mode.

Means for Solving the Problems

The problems to be solved by the present invention have been described above, and subsequently, the means of solving the problems will be described below.

According to the present invention, in an agricultural work vehicle which can be communicated via a transceiver with a host computer having a storage device storing past weather information, field information, work information, work machine information and farm product information, and can be operated by a remote control apparatus, the agricultural work vehicle has a position calculation means measuring a position of the vehicle by a satellite positioning system, a steering actuator operating a steering device, an engine rotation control means, a speed change means, and a control device controlling them. An optimum work speed and an optimum work drive value calculated from the past and current weather information, the field information, the work information, the work machine information, and the farm product information are transmitted from the host computer to the control device of the agricultural work vehicle. The agricultural work vehicle is controlled to work at the optimum work speed and the optimum work drive value along a set travel route.

According to the present invention, a slip rate is calculated from a set travel speed of the set travel route of the agricultural work vehicle, an actual travel speed and a travel distance calculated from the satellite positioning system so as to obtain hardness of a field surface, and the set travel speed is compensated from the hardness of the field surface.

According to the present invention, a height of a work machine is compensated from the hardness of the field surface.

According to the present invention, a parallel travel work system in which the plurality of the agricultural work vehicles travel in parallel and execute work. Each of the agricultural work vehicles has the control device and the transceiver and the transceiver can be communicated with the one remote control apparatus. The plurality of the agricultural work vehicles are operated remotely by the remote control apparatus.

According to the present invention, when an abnormality occurs in one of the plurality of the agricultural work vehicles and the agricultural work vehicle stops work and travel, the other agricultural work vehicle stops the work and travel simultaneously.

According to the present invention, one of the plurality of the agricultural work vehicles is regarded as a standard vehicle and the other agricultural work vehicle is regarded as an auxiliary vehicle. Each of the vehicles measures its position with the satellite positioning system and a distance between the standard vehicle and the auxiliary vehicles is measured. When the distance between the standard vehicle and the auxiliary vehicles is shorter or longer than a set range, a speed change means is controlled by the control device of the auxiliary vehicle and a travel speed of the auxiliary vehicle is changed so as to make the distance within the set range.

Effect of the Invention

According to the above means, the agricultural work vehicle can calculate the optimum conditions and work while communicating with the host computer on real time so as to work with the work machine at the optimum conditions corresponding to the farm product while traveling at the optimum work speed corresponding to the weather information and the hardness of the soil. The host computer can unify and manage the weather information, the field information, the work information, the work machine information, and the farm product information, and can collect the field and work information and applicate to further work broadly. Furthermore, the work of the one field can be performed by the plurality of the vehicles, whereby the work time can be shortened so as to improve the work efficiency.

DETAILED DESCRIPTION OF THE INVENTION

An embodiment in which an agricultural work vehicle 1 which can travel automatically unmannedly is a tractor, and a rotary tilling device is attached as work machines to the agricultural work vehicle 1 is explained. The agricultural work vehicle 1 is not limited to the tractor and may alternatively be a combine or the like. The work machine is not limited to the rotary tilling device and may alternatively be a furrower, a mower, a rake, a seeding machine, a fertilizing machine, a wagon or the like.

Figure 1:
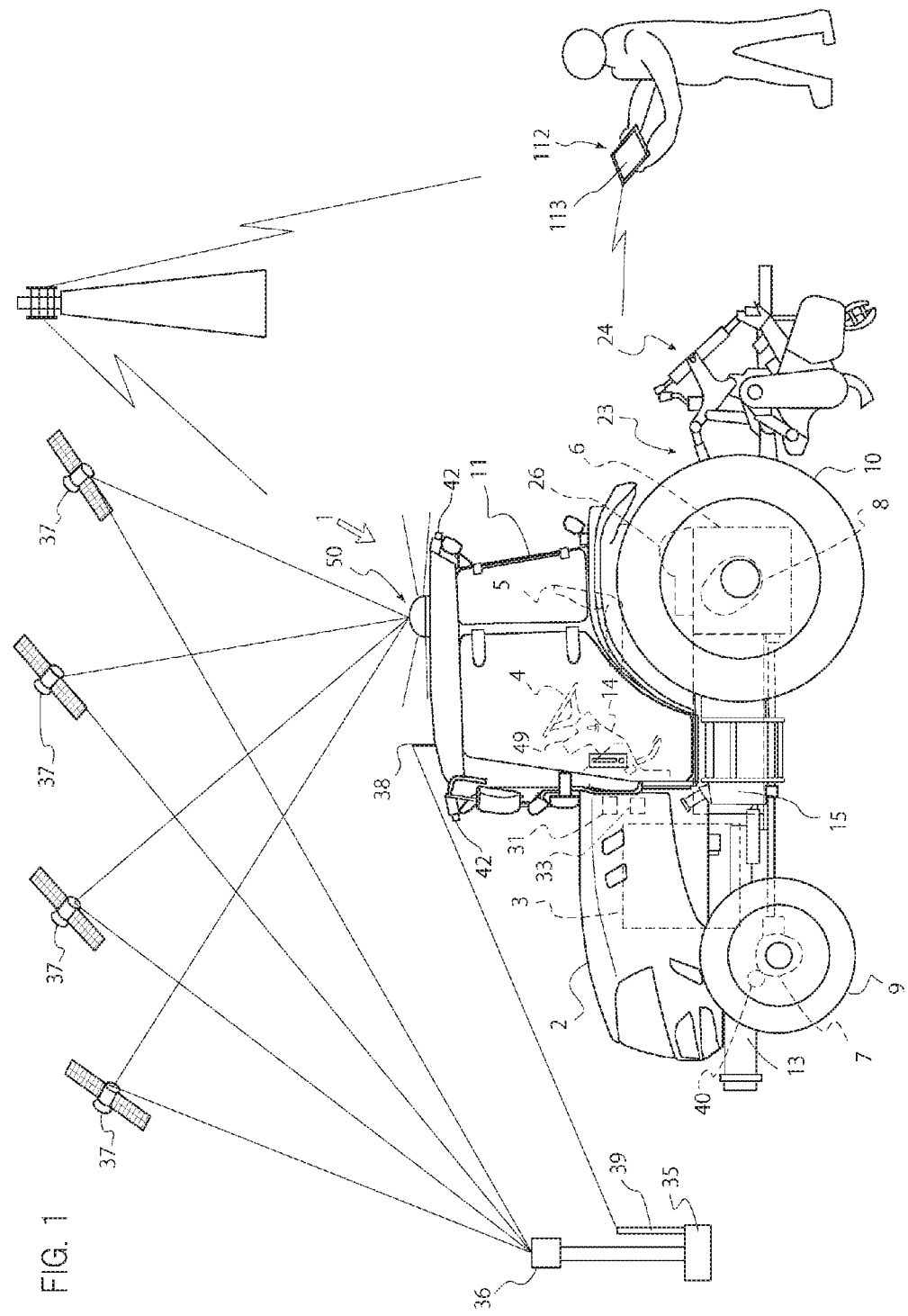
FIG. 1 is a schematic side view of an agricultural work vehicle, a GPS satellite and a reference station.
Figure 2:
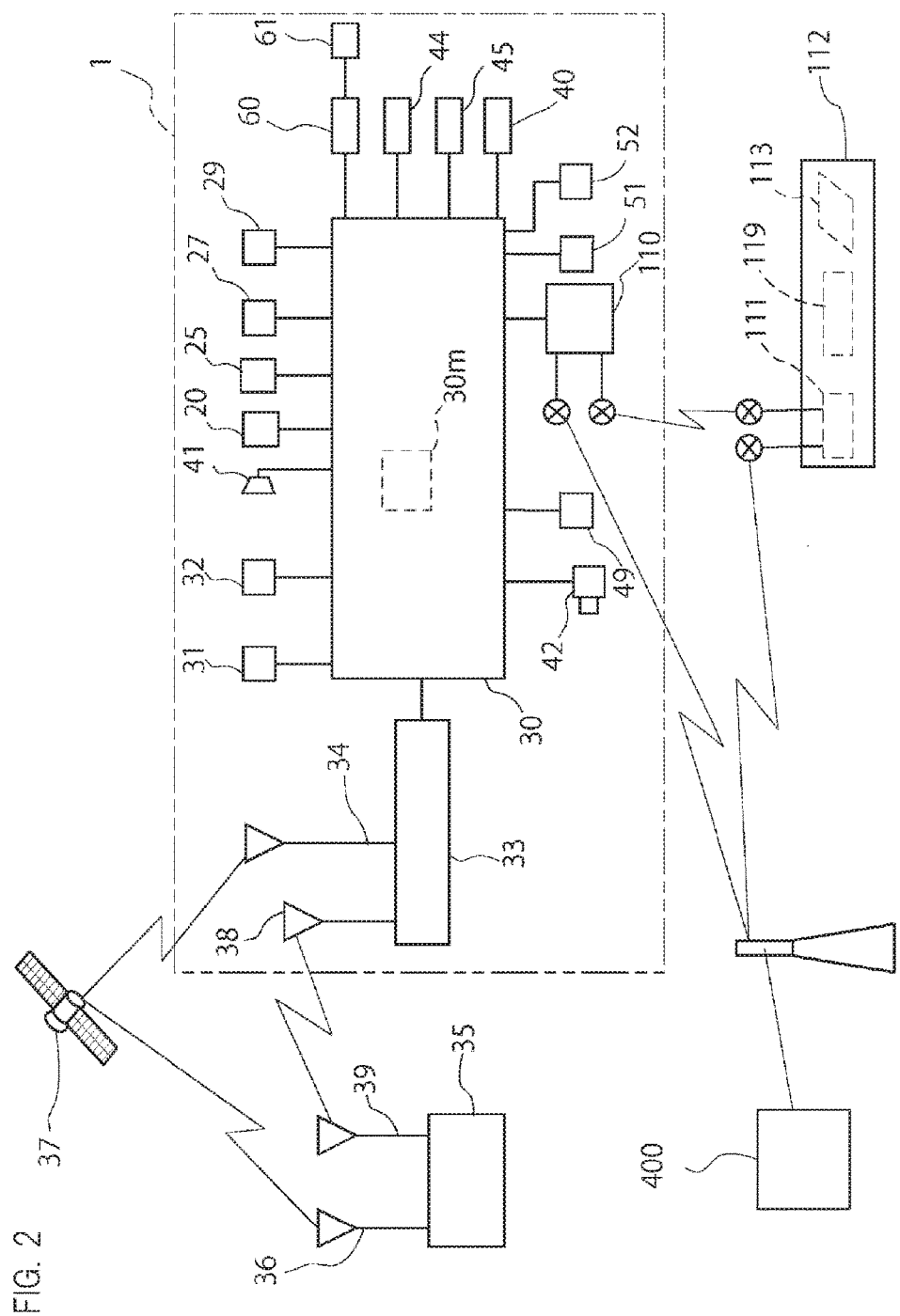
FIG. 2 is a control block diagram.

An entire configuration of the tractor which is the agricultural work vehicle 1 is explained referring to FIGS. 1 and 2. An engine 3 is provided in a bonnet 2, a dashboard 14 is provided in a cabin 11 behind the bonnet 2, and a steering wheel 4 which is a steering operation means is provided on the dashboard 14. By rotating the steering wheel 4, a direction of front wheels 9 is rotated via a steering device. A steering direction of the agricultural work vehicle 1 is detected by a steering sensor 20. The steering sensor 20 includes an angle sensor such as a rotary encoder and arranged at a rotation base of the front wheels 9. A detection configuration of the steering sensor 20 is not limited and any configuration which recognizes the steering direction may be used. Rotation of the steering wheel 4 may be recognized, or an operation amount of power steering may be recognized. A detection value obtained by the steering sensor 20 is inputted into a control device 30.

A seat 5 is disposed behind the steering wheel 4, and a transmission casing 6 is arranged below the seat 5. At left aid right sides of the transmission casing 6, rear axle casings 8 are provided continuously, and rear wheels 10 are supported via axles by the rear axle casings 8. Power from the engine 3 is changed in speed by a transmission (a main transmission and a sub transmission) in the transmission casing 6 and can drive the rear wheels 10. For example, the transmission includes a hydraulic stepless transmission, and a movable swash plate of a variable capacity hydraulic pump is operated by a speed change means 44 such as a motor so as to perform the speed change. The speed change means 44 is connected to the control device 30. A rotation speed of the rear wheels 10 is detected by a vehicle speed sensor 27, and inputted into the control device 30 as a travel speed. A detection method of a vehicle speed and an arrangement position of the vehicle speed sensor 27 are not limited.

A PTO clutch and a PTO transmission are housed in the transmission casing 6. The PTO clutch is engaged and disengaged by a PTO switching means 45. The PTO switching means 45 is connected to the control device 30 so as to control connection and disconnection of power transmission to a PTO shaft.

A front axle casing 7 is supported by a front frame 13 supporting the engine 3 and the front wheels 9 are supported at both sides of the front axle casing 7 so that power from the transmission casing 6 can be transmitted to the front wheels 9. The front wheels 9 are steering wheels and turned by rotation operation of the steering wheel 4, and the front wheels 9 can be steered laterally by a steering actuator 40 including a power steering cylinder which is a steering driving means. The steering actuator 40 is connected to the control device 30 and driven by automatic traveling control.

An engine controller 60 which is an engine rotation control means is connected to the control device 30, and an engine rotation speed sensor 61, a water temperature sensor, a hydraulic pressure sensor and the like are connected to the engine controller 60 so as to detect a state of the engine. The engine controller 60 can detect a load from a set rotation speed and an actual rotation speed and perform control so as to prevent overload, and can transmit the state of the engine 3 to a remote control apparatus 112 discussed later so as to display the state of the engine 3 on a display 113.

In a fuel tank 15 below a step, a level sensor 29 detecting a level of fuel is arranged and connected to the control device 30. In a display means 49 provided in the dashboard of the agricultural work vehicle 1, a fuel gauge displaying residual amount of fuel is provided and connected to the control device 30. Information about the fuel residual amount is transmitted from the control device 30 to the remote control apparatus 112, and the fuel residual amount and workable time are displayed on the display 113 of the remote control apparatus 112.

On the dashboard 14, the display means 49 displaying a rotation meter of the engine, the fuel gauge, a monitor displaying hydraulic pressure and abnormality, a set value and the like are arranged.

The rotary tilling device 24 is provided movably vertically as the work machine behind a vehicle body of the tractor via a work machine attachment device 23 so as to perform tilling work. A lifting cylinder 26 is provided on the transmission casing 6, and by extending and contracting the lifting cylinder 26, a lifting arm constituting the work machine attachment device 23 is rotated so as to move the rotary tilling device 24 vertically. The lifting cylinder 26 is extended and contracted by a lifting actuator 25, and the lifting actuator 25 is connected to the control device 30.

A mobile receiver 33 constituting a satellite positioning system is connected to the control device 30. A mobile GPS antenna 34 and a data reception antenna 38 are connected to the mobile receiver 33, and the mobile GPS antenna 34 and the data reception antenna 38 are provided on the cabin 11. The mobile receiver 33 has a position calculation means and can transmit latitude and longitude to the control device 30 so as to grasp an actual position. In addition to a GPS satellite (America), by using a global navigation satellite system (GNSS) such as a quasi-zenith satellite (Japan) and a GLONASS satellite (Russia), more accurate positioning can be performed. However, this embodiment is explained with the GPS satellite.

A gyro sensor 31 as an inertia measurement device for obtaining information about change of posture of the vehicle body and an azimuth sensor 32 for detecting a traveling direction are provided in the agricultural work vehicle 1 and connected to the control device 30. The azimuth sensor 32 can be omitted because the traveling direction can be calculated by position measurement of the GPS.

The gyro sensor 31 detects an angle speed of inclination in a longitudinal direction of the agricultural work vehicle 1 (pitch), an angle speed of inclination in a lateral direction thereof (roll) and an angle speed of turning thereof (yaw). By integrating the three angle speeds, the inclination angles in the longitudinal direction and the lateral direction and the turning angle of the agricultural work vehicle 1 can be found. As a concrete example of the gyro sensor 31, a mechanical gyro sensor, an optical gyro sensor, a fluid type gyro sensor, a vibration type gyro sensor and the like are mentioned. The gyro sensor 31 is connected to the control device 30 and inputs information about the three angle speeds to the control device 30.

The azimuth sensor 32 detects a direction of the agricultural work vehicle 1 (traveling direction). As a concrete example of the azimuth sensor 32, a magnetic azimuth sensor and the like are mentioned. The azimuth sensor 32 is connected to the control device 30 and inputs information about the direction of the vehicle body to the control device 30.

As the above, the control device 30 calculates signals obtained from the gyro sensor 31 and the azimuth sensor 32 by a posture-azimuth calculation means so as to find the posture of the agricultural work vehicle 1 (the direction of the vehicle body, the inclination in the longitudinal direction and the lateral direction, and the turning direction).

Next, a method obtaining position information of the agricultural work vehicle 1 by the GPS (global positioning system) is explained.

The GPS is a system developed originally for navigation support of an airplane, a ship and the like, and includes twenty four GPS satellites (four satellites in each of six raceway surfaces) going around at an altitude of about 20,000 km, a control station pursuing and controlling the GPS satellites, and a receiver of an user for positioning.

As a positioning method using the GPS, various methods such as independent positioning, relative positioning, DGPS (differential GPS) positioning and RTK-GPS (real time kinematic GPS) positioning are mentioned, and either of these methods can be used. In this embodiment, a RTK-GPS positioning method with high accuracy is adopted and this method is explained referring to FIGS. 1 and 2.

The RTK-GPS (real time kinematic GPS) positioning is a method that GPS observation is performed simultaneously at a reference station whose position is known and a mobile station whose position is to be found, data observed at the reference station is transmitted to the mobile station on real time by a method such as wireless communication, and the position of the mobile station is found on real time based on positional results of the reference station.

In this embodiment, the mobile receiver 33, the mobile GPS antenna 34 and the data reception antenna 38 constituting the mobile station are arranged in the agricultural work vehicle 1, and a fixed receiver 35, a fixed GPS antenna 36 and a data transmission antenna 39 constituting the reference station are disposed at a predetermined position not being obstacle of work in the field. In the RTK-GPS (real time kinematic GPS) positioning of this embodiment, measurement of a phase (relative positioning) is performed at both the reference station and the mobile station, and data positioned by the fixed receiver 35 of the reference station is transmitted from the data transmission antenna 39 to the data reception antenna 38.

The mobile GPS antenna 34 arranged in the agricultural work vehicle 1 receives signals from GPS satellites 37. The signals are transmitted to the mobile receiver 33 and positioned. Simultaneously, the signals from GPS satellites 37 are received by the fixed GPS antenna 36 which is the reference station, positioned by the fixed receiver 35 and transmitted to the mobile receiver 33, and the measured data are analyzed so as to determine the position of the mobile station. The position information obtained as the above is transmitted to the control device 30.

Accordingly, the control device 30 of the agricultural work vehicle 1 receives electric waves transmitted from the GPS satellites 37, finds the position information of the vehicle body at set time intervals in the mobile receiver 33, and finds displacement information and azimuth information of the vehicle body from the gyro sensor 31 and the azimuth sensor 32, and controls the steering actuator 40, the speed change means 44, and the like.

An obstacle sensor 41 is arranged in the agricultural work vehicle 1 and connected to the control device 30 so as to prevent contact with the obstacle. For example, the obstacle sensor 41 includes an ultrasonic sensor, arranged at front, side or rear part of the vehicle body and connected to the control device 30, and detects whether an obstacle exists before, beside or behind the vehicle body and stops the traveling when the obstacle approaches within a set distance.

In the agricultural work vehicle 1, the camera 42 photting a front side and the work machine is mounted and connected to the control device 30. An image photted by the camera 42 is displayed on the display 113 of the remote control device 112. When a display screen of the display 113 is small, the image may be displayed by another large display, or the camera image may be displayed always or alternatively by another display of exclusive use or displayed by the display means 49 provided in the agricultural work vehicle 1.

Figure 7:
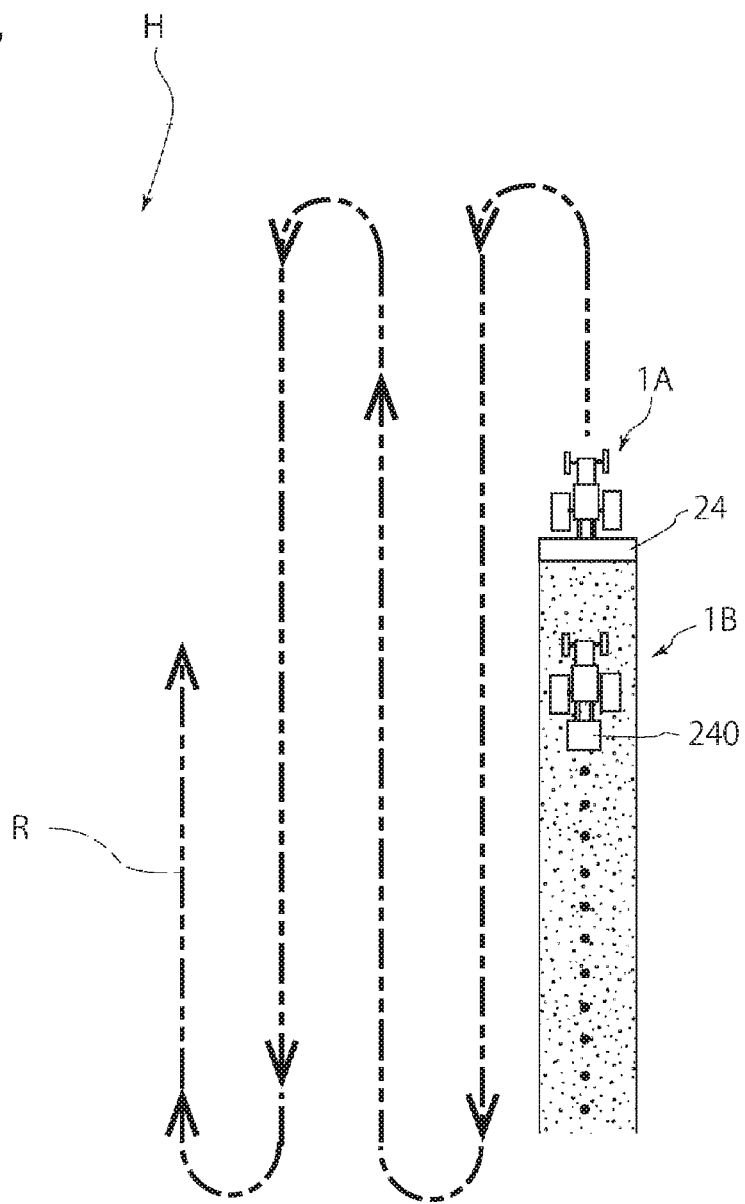
FIG. 7 is a drawing of a state in which work is performed by two vehicles.

As shown in FIG. 7, the remote control device 112 sets a travel route R, control remotely the agricultural work vehicle 1, supervises travel state of the agricultural work vehicle 1 and operation state of the work machine, and stores work data so as to enable the agricultural work vehicle 1 to work unmannedly in the field H. For example, the remote control apparatus 112 can be configured by a note-type or tablet-type personal computer. In this embodiment, a tablet-type personal computer is used. Map data (information) is referred to for determining a position of the field H, traveling with the satellite positioning system and setting the travel route R. As this map data, map data disclosed in the internet, map data distributed by a map maker or the like, car navigation map data or the like is used.

The inertia measurement device (gyro sensor) 31, the mobile GPS antenna 34, and a speaker 51, lamps 52 and a circuit board 53 as an alarm device are configured integrally and housed in one casing 54 so as to configure an antenna unit 50.

Figure 3:
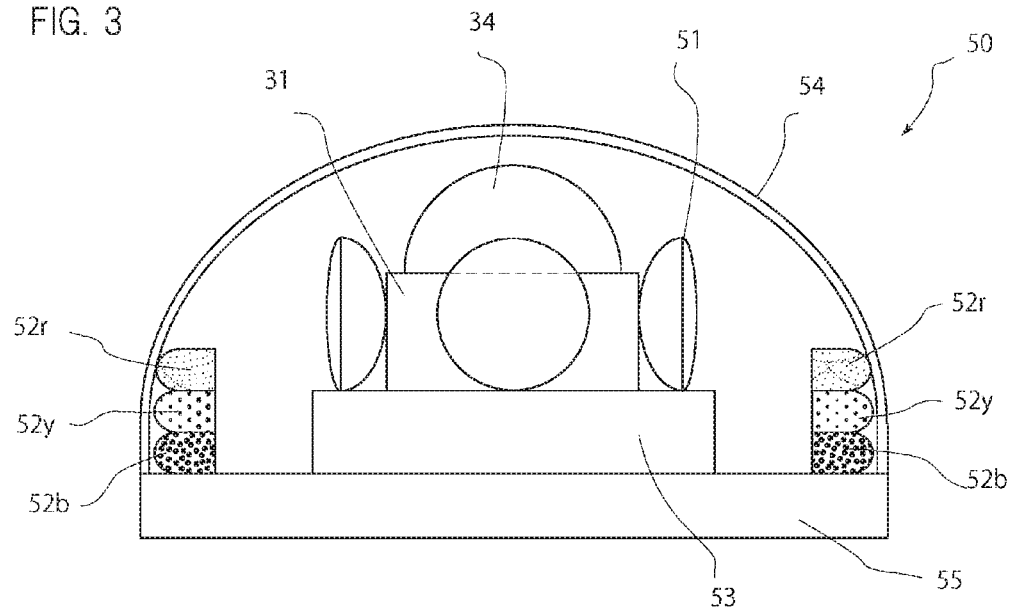
FIG. 3 is a sectional side view of an antenna unit.
Figure 4:
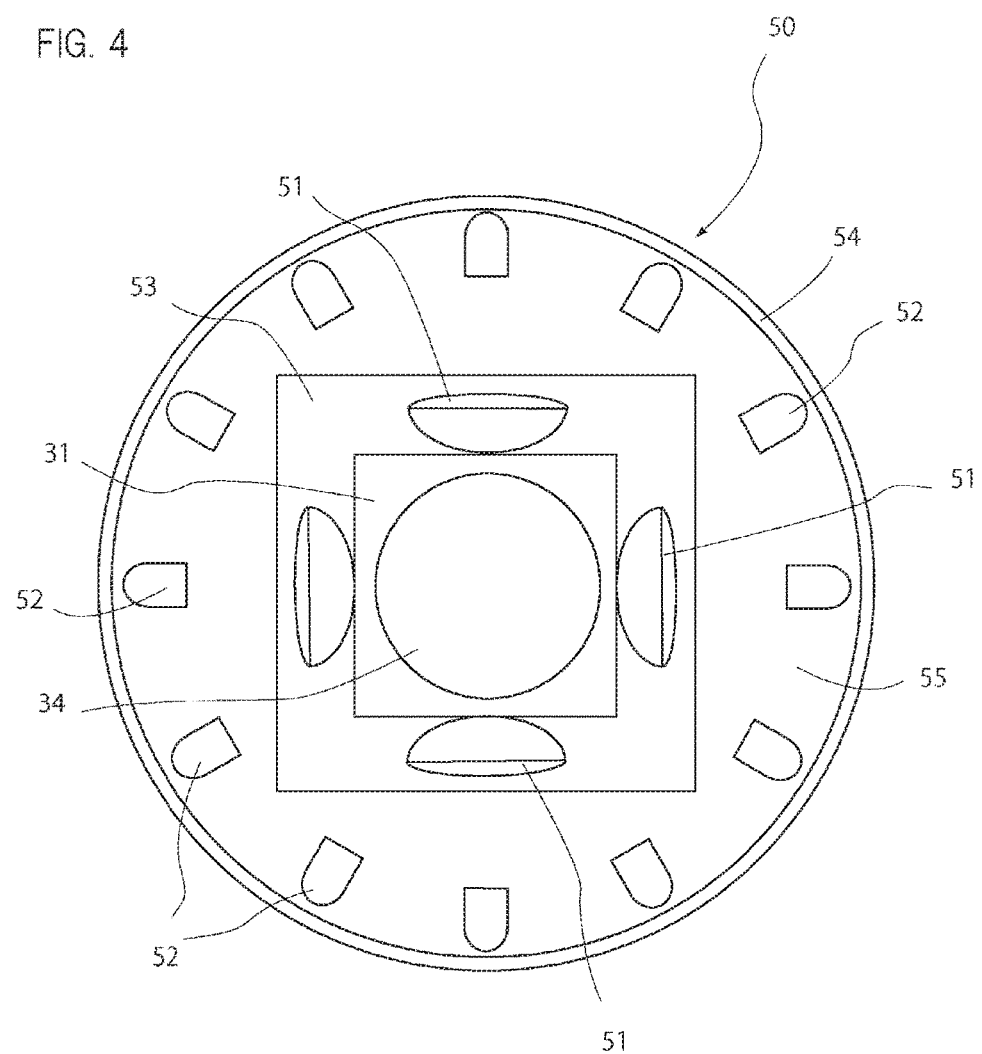
FIG. 4 is a plan view of the antenna unit.

As shown in FIGS. 1, 3 and 4, in the antenna unit 50, the casing 54 is configured hemispherically by transparent or translucent resin and fixed on a circular bottom plate 55. A magnet is stuck integrally to the bottom plate 55 and adhered and attached to an optional position of a roof of the cabin 11. Accordingly, the antenna unit 50 can be attached and detached, and adjustment of attachment position and maintenance can be performed easily.

The circuit board 53 is provided on a center of the bottom plate 55, and on the circuit board 53, a driving circuit of the speaker 51 and the lamps 52 and a power supply circuit of the inertia measurement device 31 and connected to the control device 30. The mobile GPS antenna 34 and the inertia measurement device 31 are provided on the circuit board 53, the speaker 51 is provided outside them, and the lamps 52 are arranged along an outer perimeter.

The one speaker 51 or the plurality of the speakers 51 are arranged so as to emit sound outside. The speaker 51 can emit voice, music, intermittent sound and the like, and kind and volume of sound is changed corresponding to a state of the agricultural work vehicle 1. In this embodiment, the four speakers 51 are arranged so as to emit sound to the front, the rear, the left and the right. It may alternatively be configured that a buzzer is used instead of the speaker 51 and the state of the agricultural work vehicle 1 is expressed by continuous sound and intermittent sound or a plurality of buzzers with different tones. The sound emitted by the speakers 51 is interlocked with lighting of the lamps 52.

Figure 5:
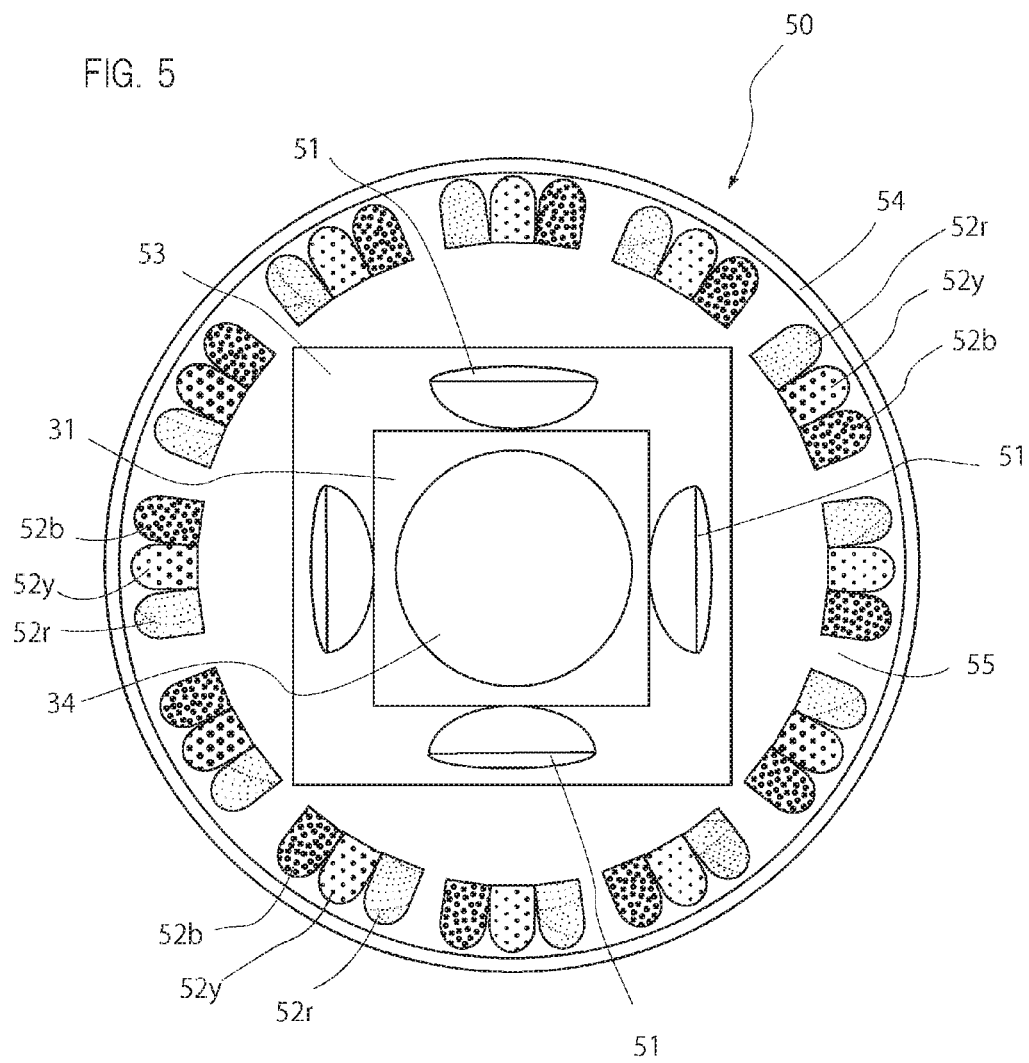
FIG. 5 is a plan view of another embodiment of the antenna unit.

In this embodiment, a LED is used as each of the lamps 52. However, a luminous body is not limited thereto and may alternatively be organic EL, an electric bulb or the like. The plurality of the lamps 52 with different luminous colors are aligned and arranged. For example, as shown in FIG. 3, the lamps 52 are arranged circularly belt like in an order of blue, red and yellow repeatedly. Otherwise, as shown in FIG. 5, blue, red and yellow longitudinal lines are arranged repeatedly circularly. Arrangement positions of the lamps 52 are not limited, and a plurality of pairs of the lamps 52 with different colors should just be arranged in order. The luminous colors of the lamps 52 are not limited. Accordingly, the state of the agricultural work vehicle 1 can be judged by the luminous colors and the sound.

Concretely, when the blue lamps 52b are lightened or blinked, the agricultural work vehicle 1 travels normally automatically. In this case, the speakers 51 emit comfortable music or melody (like a march or a children's song) which expresses that the travel is smooth. Accordingly, approach of the agricultural work vehicle 1 is notified to surrounding persons.

When the yellow lamps 52y are lightened or blinked, a noteworthy situation in which it is not necessary to stop the agricultural work vehicle 1 occurs. In this case, the speakers 51 emit sound whose volume is not so large and urging cautions. Otherwise, cautions are notified by voice. For example, fuel is decreased, overload of the work machine is not recovered for not less than set time, exchange of parts of the engine or the other apparatus approach, or the like. The lighting and sound of the yellow lamps 52y bring to an operator and an assistant attention.

When the red lamps 52r are lightened or blinked, abnormality occurs on the agricultural work vehicle 1 and the travel and the work are stopped. In this case, the speakers 51 emit alarm sound whose volume is relatively large. Otherwise, occurrence of abnormality is notified by voice. For example, temperature of water or oil of the engine rises higher than set temperature, fuel is not injected with predetermined amount at predetermined timing, GPS positioning cannot be performed, abnormality of a steering system shifting from the travel route or not turning, the work machine is not operated, short circuit or disconnection of an electric system occurs, or the like, and alarm sound with large volume is emitted from the speakers 51. Otherwise, an abnormal part is notified by voice. Timing of the lighting of the lamps 52 and the sound emitted from the speakers 51 are stored in a storage device 30m of the control device 30.

As the above, in the antenna unit 50 for a satellite navigation system attached to the agricultural work vehicle 1 which can travel and work along the travel route set with the satellite positioning system, the mobile GPS antenna 34, the plurality of the lamps 52 arranged around the mobile GPS antenna 34, the speakers 51, the circuit board 53 and the inertia measurement device 31 are housed integrally in the casing 54. Accordingly, the antenna unit 50 is configured compactly and can be attached and detached easily.

The lamps 52 can emit the plurality of the luminous colors, and the state of the agricultural work vehicle 1 can be recognized by the luminous color. Accordingly, only by checking the luminous color of the antenna unit 50 attached to the roof of the agricultural work vehicle 1, the state of the agricultural work vehicle 1 can be recognized from the surroundings.

The lamps 52 are interlocked with the speakers 51 and the state of the agricultural work vehicle 1 can be recognized by the luminous color and the sound emitted from the speakers 51. Accordingly, the state of the agricultural work vehicle 1 can be recognized certainly correctly by the luminous color of the lamps 52 and the sound of the speakers 51.

The remote control apparatus 112 can be attached to and detached from an operation part such as a dashboard of the agricultural work vehicle 1. The remote control apparatus 112 can be taken out from the agricultural work vehicle 1 and operated portably and can be operated while being attached to the dashboard of the agricultural work vehicle 1.

Furthermore, the remote control apparatus 112 can be communicated wirelessly with the agricultural work vehicle 1, and transceivers 110 and 111 for the communication are provided respectively in the agricultural work vehicle 1 and the remote control apparatus 112. The transceiver 111 is configured integrally with the remote control apparatus 112. The communication means can be communicated mutually by wireless LAN such as WiFi. In the remote control apparatus 112, the display 113 of a touch panel type operation screen which can be operated by touching the screen is provided in a front surface of a casing, and the transceiver 111, a CPU, a storage device, a battery and the like are housed in the casing. An image of the surrounding photted by the camera 42, state of the agricultural work vehicle 1, state of work, information about the GPS, the operation screen and the like can be displayed on the display 113 so as to be supervised by an operator.

The agricultural work vehicle 1 is traveling state, state of the engine, state of the work machine and the like. The traveling state is a speed change position, vehicle speed, fuel residue, battery voltage and the like. The state of the engine is engine rotation speed, load ratio and the like. The state of the work machine is type of the work machine, PTO rotation speed, height of the work machine and the like. These are displayed on the display 113 respectively by numerals, level meters and the like.

The state of the work is a work route (a target route or the set traveling route), a work process, an actual position, a distance to a headland calculated from the process, a remaining route, number of processes, work time until now, remaining work time and the like. The remaining route can be recognized easily by filling a route worked already in the whole work route. By showing a next process from the actual position by an arrow, a next process such as a turning direction from the actual can be recognized easily.

The information about the GPS is longitude and latitude which is the actual position of the agricultural work vehicle 1, number of grasped satellites, reception radio wave intensity, and the like.

The display 113 of the remote control apparatus 112 displays images of the surroundings taken by the camera 42 as well as the condition of the agricultural work vehicle 1, the travel route R and the like, but cannot show multiple pieces of information at one time. Therefore, the screen may be made larger and split, another display may be provided for the camera, or the screen may be switched or scrolled if needed. Accordingly, a worker can easily view the required screen.

The agricultural work vehicle 1 can be controlled remotely by the remote control apparatus 112. For example, emergency stop, temporary stop, restart, speed change, engine rotation speed change, lifting of the work machine, and connecting and disconnecting of the PTO clutch of the agricultural work vehicle 1 can be operated. Namely, the accelerator actuator, the speed change means 44, the PTO switch 45 and the like are controlled by the remote control apparatus 112 via the transceivers 111 and 110 and the control device 30 so that an operator can easily control the agricultural work vehicle 1 remotely.

Figure 6:
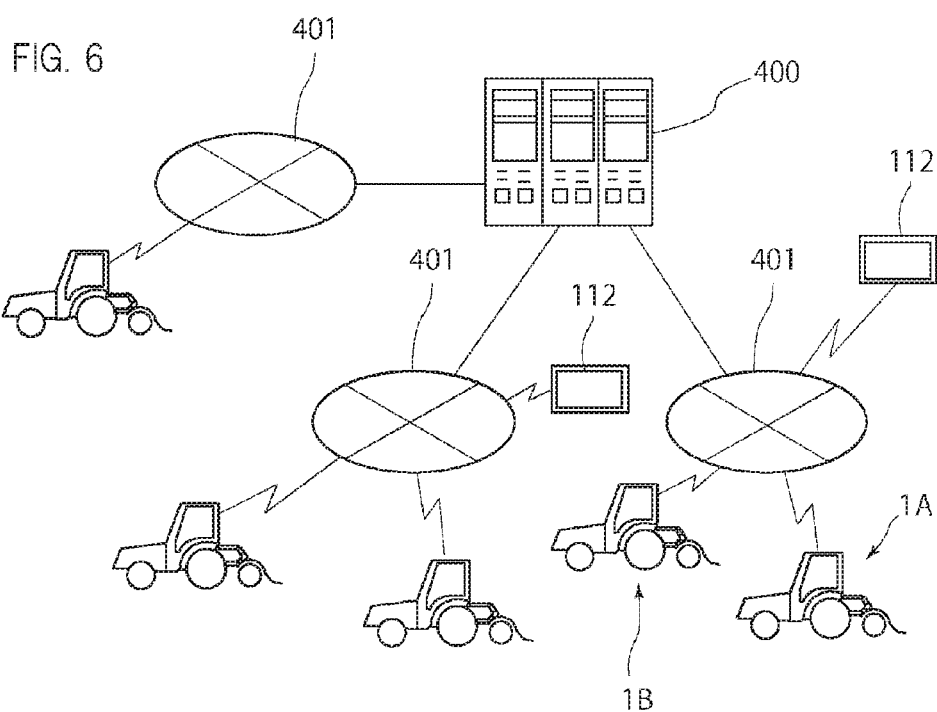
FIG. 6 is a schematic drawing of communication among a host computer, the agricultural work vehicle and a remote control apparatus.

As shown in FIG. 6, the remote control apparatus 112 which is an operation terminal and the control device 30 of the agricultural work vehicle 1 can be connected to a host computer 400 via a communication circuit 401. The host computer 400 can also be connected to an operation terminal and an agricultural work vehicle of another user via the communication circuit so as to obtain work state, vehicle information, work machine information, farm product information and the like from the other fields. The communication circuit 401 can transmit and receive information mutually via a public telephone network (including mobile communication such as cellular phones) and internet. The host computer 400 is arranged at a predetermined position of a maker.

The host computer 400 has an input part of data and a command, a storage part storing inputted data, calculated data and the like, an output part outputting the data to a display device or the like, a control part controlling the communication and the processing parts, and the like. An information file is made into database and stored in the storage part, and the data inputted by the control part can be made into a file, registered, updated, calculated and outputted. The information file is made for each user, and includes an user ID, vehicle information such as kinds, maintenance and check of the vehicle and the work machine, weather information such as weather, temperature and precipitation, map information, work information such as cultivation information, seeding information, weeding information, fertilization information, pest control information and yield information for each farm product, soil information such as quality and hardness of soil of each field, farm product information such as seeding period, seeding amount, transplanting period, pest control period, control work, harvesting period and yield of each farm product, and the like.

In this configuration, before starting the work, the travel route R along which the work is performed, work speed, and work height and work depth as work drive value in the case of rotary tilling (in the case of the seeding machine or the fertilizing machine, feeding amount, feeding interval and depth) and the like are set, and a kind of the cropped farm product, the work machine to be used, and weather information of actual position (in the case of being far from the host computer 400) are transmitted to the host computer 400. The host computer 400 searches work data of a past weather condition the most similar to the transmitted weather information, and displays a work condition (work drive value) with the best work efficiency and the largest yield on the display 113. When this setting is enough, execution is selected, and when change of the setting is wished, each item is changed.

After starting the work, a state of the field is detected and compared with the data stored in the host computer 400, and when different therebetween is not less than a set value, the work condition is compensated on real time. For example, though the work is performed while the tractor travels at set speed, when distance and time of the traveling on the travel route R are measured, attainment time may be larger than set time. In this case, it is judged that slip occurs. Otherwise, it is judged that load is increased and the rotation speed is reduced. When the slip occurs, the soil is softened after rain, whereby tilting depth is increased. Then, in the host computer 400, a state of slip (slip rate) is calculated from a set travel speed, an actual travel speed and a travel distance (calculated by GPS positioning), and as large as the slip is, as much as a height of the work machine is increased. In the case in which the work machine is a seeding machine, a fertilizing machine, a pest control machine or the like, when the slip rate is high, intervals of seeding or fertilizing becomes short or pest control becomes excessive. Accordingly, compensation amounts of the travel speed and the work drive value are calculated and transmitted to the agricultural work vehicle via the transceiver by the host computer 400 so as to enlarge the intervals of seeding or fertilizing or reduce the pest control corresponding to the slip rate. The agricultural work vehicle operates an actuator while compensating a control amount thereof corresponding to the work drive value.

At the time of the work or the setting of the work, in the host computer 400, long-term weather information is obtained from the internet or the like and stored as data, and when the long-term weather information is forecast of much rain, the lifting actuator is controlled so as to raise a height of a ridge and improve drainage at the time of furrowing work. At the time of seeding or transplanting work, a feeding actuator is controlled so as to extend seeding or transplanting intervals for preventing disease and noxious insects from increasing and improving ventilation. In the case of using short-term weather forecast information, when a forecast of raining in the afternoon is obtained in the morning, the work speed is controlled to be raised, whereby the work of one section is finished in the morning before the rain so as not to leave any halfway work range.

It may alternatively be configured that the two agricultural work vehicles perform different works. In this case, the precedence agricultural work vehicle 1A detects the field and transmits a detection value to the host computer 400, and a compensation value is transmitted to the following agricultural work vehicle 1B so as to correspond to the actual state of the field, whereby feedback is performed on real time. Both the agricultural work vehicles 1A and 1B may be unmanned, or it may alternatively be configured that one of them is unmanned and the other thereof is manned.

For example, as shown in FIG. 7, in the case in which the precedence agricultural work vehicle 1A performs tilling work with the rotary tilling device 24 and the following agricultural work vehicle 1B performs seeding work with a seeding machine 240, the host computer 400 determines the work drive values of the precedence and following work vehicles 1A and 1B with reference to past work data, and the work is started at the work drive values with high work efficiency. After starting the work, when the soil is softened under the influence of raining in the middle of work, the precedence agricultural work vehicle 1A may slip or tilting depth of the rotary tilling device may be increased. This information is transmitted to the host computer 400 and the compensation value is calculated. The host computer 400 transmits the compensation information to the precedence agricultural work vehicle 1A and the following agricultural work vehicle 1B. Accordingly, a position at which the soil is softened is detected by the precedence agricultural work vehicle 1A so that the control of the following agricultural work vehicle 1B is not delayed, whereby accurate compensation control can be performed.

Between a sensor and an actuator of the work machine such as the seeding machine 240, the fertilizing machine or the pest control machine and the control device 30 of the vehicle, information communication is enabled via a transceiver (ISO-BUS). Information from the work machine can be transmitted via the control device 30 of the vehicle to the host computer 400, and the actuator of the work machine can be operated by a command from the host computer 400. For example, in the case of the seeding machine, when seeding number and seeding interval are set and a feeding motor which is the actuator is operated so as to perform seeding work, kind of seeds, amount, depth and interval of the seeding in the specified (registered) field are transmitted to the host computer 400. At this time, work speed, field information, weather information, vehicle information and the like are transmitted to the host computer 400 by the control device 30 of the vehicle and stored as a database.

Work information of work performed by another agricultural work vehicle is stored in the host computer 400 and the same work contents performed in the neighborhood can be compared so as to draw optimal work condition. The information can be transmitted to the remote control apparatus 112 and seen, and can be taken in and applied to actual work, whereby the work is controlled so as to be optimized.

When the other one agricultural work vehicle 1 is manned, an operator can ride on and operate the one agricultural work vehicle 1 and can operate the other agricultural work vehicle 1 by mounting the remote control apparatus 112 on the one agricultural work vehicle 1. Basic configurations of the agricultural work vehicles 1A and 1B are the same.

As the above, the agricultural work vehicle 1 can be communicated via the transceiver with the host computer 400 having the storage device storing the past weather information, field information, work information, work machine information and farm product information, and can be operated by the remote control apparatus 112. The agricultural work vehicle 1 has the position calculation means measuring the position of the vehicle by the satellite positioning system, the steering actuator operating the steering device, the engine rotation control means, the speed change means, and the control device controlling them. An optimum work speed and an optimum work drive value calculated from the past and current weather information, the field information, the work information, the work machine information, and the farm product information are transmitted from the host computer 400 to the control device 30 of the agricultural work vehicle 1. The agricultural work vehicle 1 is controlled to work at the optimum work speed and the optimum work drive value along the set travel route R. Accordingly, the agricultural work vehicle 1 can calculate the optimum conditions and work while communicating with the host computer 400 on real time so as to work with the work machine at the optimum conditions corresponding to the farm product while traveling at the optimum work speed corresponding to the weather information and the hardness of the soil. The host computer 400 can unify and manage the weather information, the field information, the work information, the work machine information, and the farm product information, and can collect the field information and applicate to further work broadly.

The slip rate is calculated from the set travel speed of the set travel route R of the agricultural work vehicle 1, the actual travel speed and the travel distance calculated from the satellite positioning system so as to obtain the hardness of the field surface, and the set travel speed is compensated from the hardness of the field surface. Accordingly, the optimum work can be performed by the current information in addition to the past information.

The height of the work machine is compensated from the hardness of the field surface. Accordingly, the work can be performed at the height corresponding to the actual hardness, whereby the work efficiency is improved so as to improve growth and yield of the cropped farm product.

Figure 8:
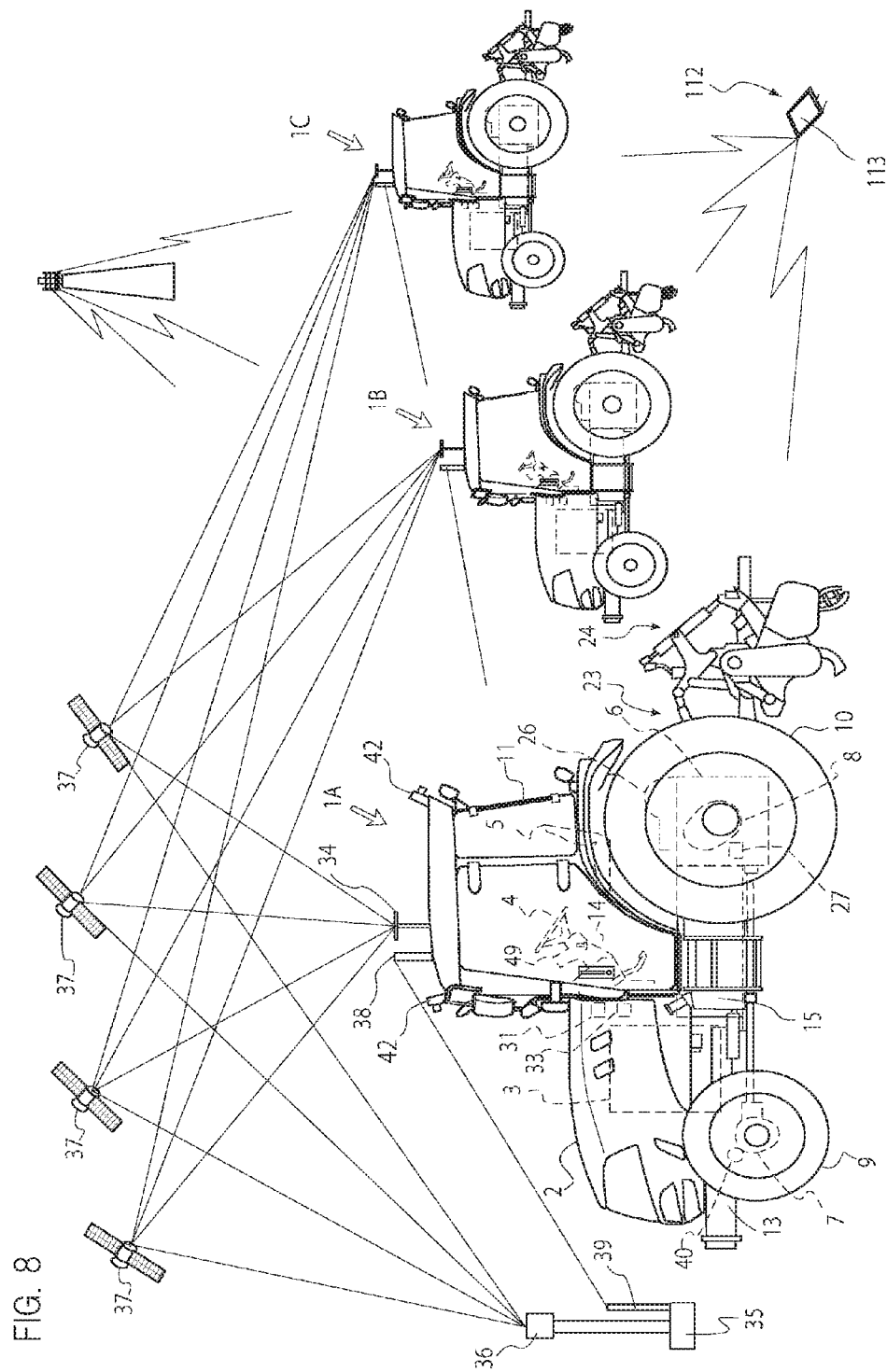
FIG. 8 is a schematic side view of the plurality of the agricultural work vehicles, the GPS satellite and the reference station.
Figure 9:
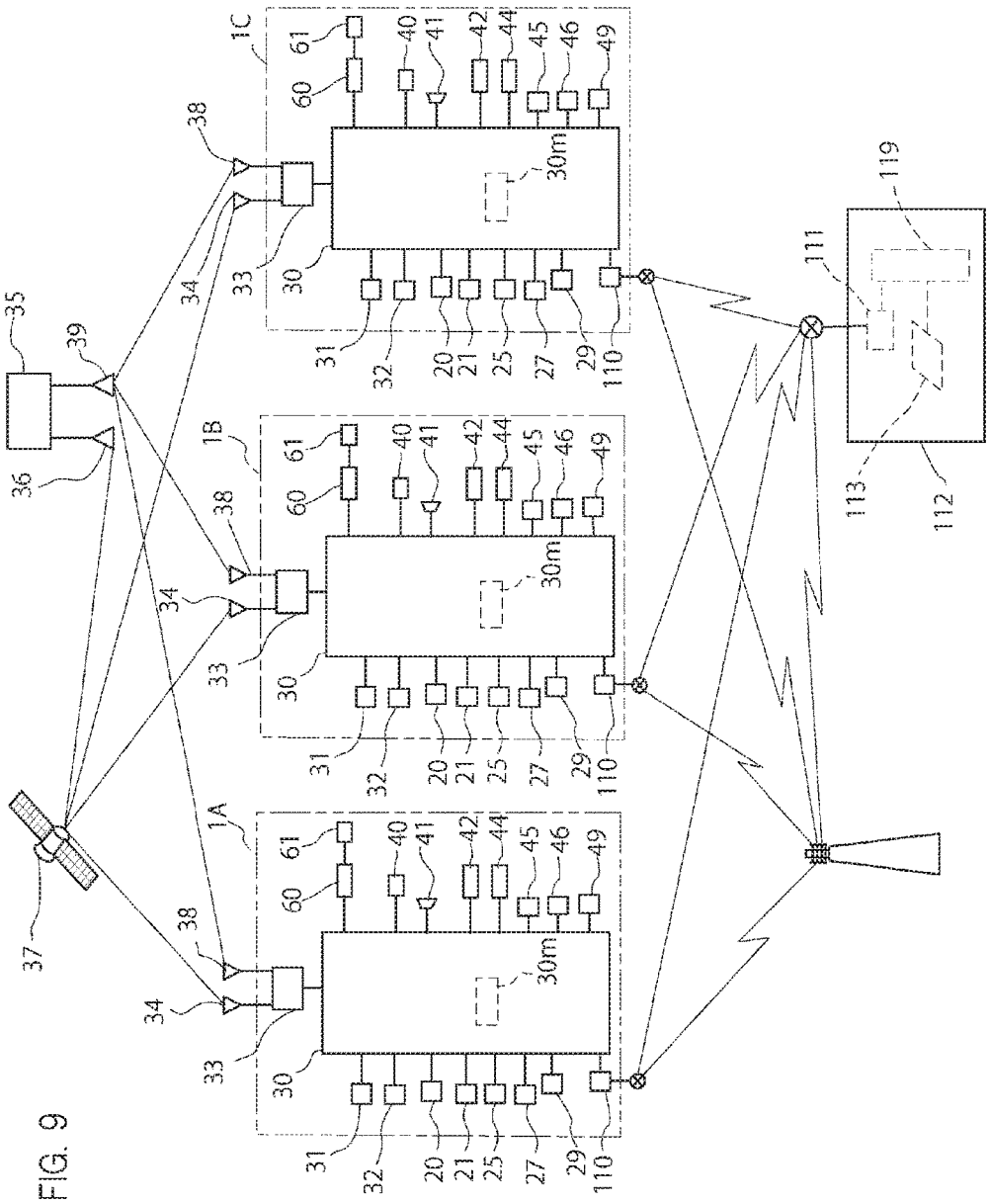
FIG. 9 is a control block diagram of the plurality of the agricultural work vehicles.
Figure 10:
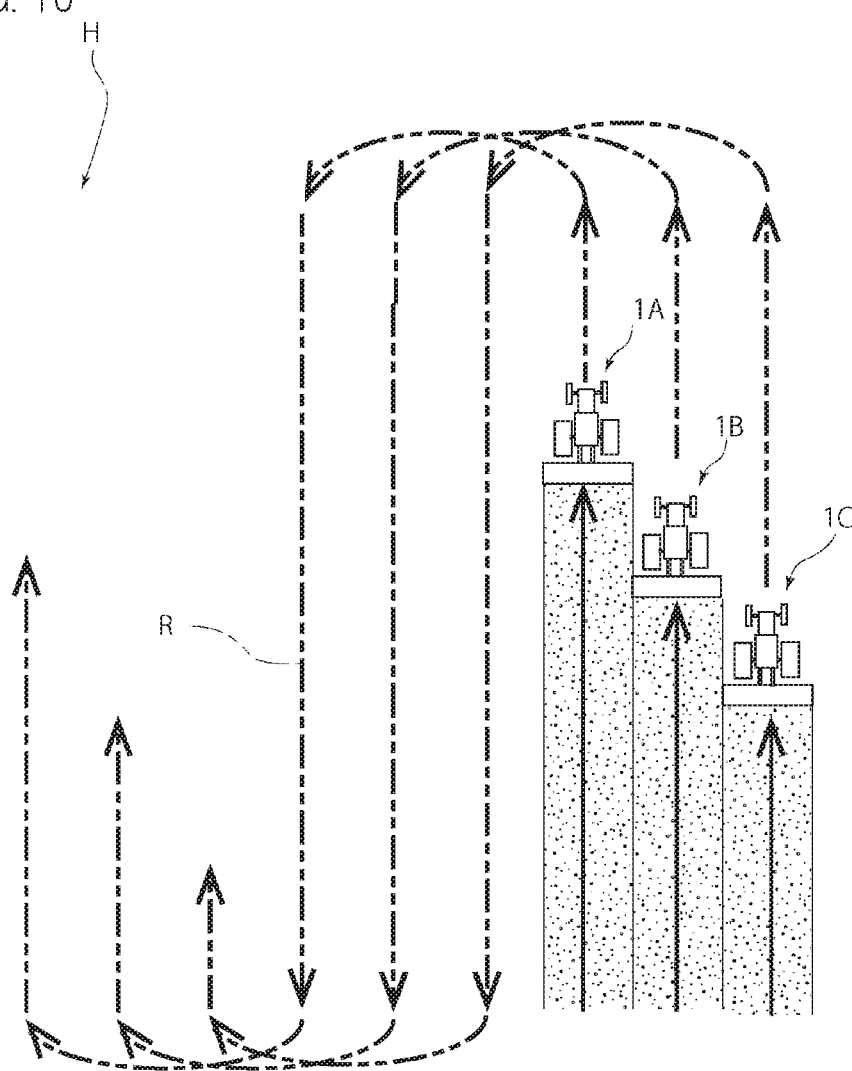
FIG. 10 is a drawing of a state in which work is performed by the plurality of the agricultural work vehicles traveling in parallel aslant.

Next, an embodiment in which the plurality of the autonomous travel work vehicles 1 travel autonomously and are controlled by the remote control apparatus 112 is explained. In FIGS. 8, 9 and 10, an explanation is given while the plurality of the autonomous travel work vehicles are referred to as a first autonomous travel work vehicle 1A, a second autonomous travel work vehicle 1B and a third autonomous travel work vehicle 1C.

In each of the first autonomous travel work vehicle 1A, the second autonomous travel work vehicle 1B and the third autonomous travel work vehicle 1C, the set route R set previously is stored in the storage device 30m. When start of the work is operated by the remote control apparatus 112, the first autonomous travel work vehicle 1A, the second autonomous travel work vehicle 1B and the third autonomous travel work vehicle 1C travel in parallel reciprocally along the set travel route R in the field H and work, and an operator holds and operates the remote control apparatus 112 in the vicinity thereof. The control devices 30 and the remote control apparatus 112 can be connected to the host computer 400 via the transceivers 110 and 111 and the communication circuit 401.

The remote control apparatus 112 cam control the first autonomous travel work vehicle 1A, the second autonomous travel work vehicle 1B and the third autonomous travel work vehicle 1C respectively, switch and control one of the first autonomous travel work vehicle 1A, the second autonomous travel work vehicle 1B and the third autonomous travel work vehicle 1C, and control the three vehicles simultaneously at the time of start of the work and sudden stop. The four or more work vehicles can travel in parallel and work so as to improve the work efficiency further. Each of the first autonomous travel work vehicle 1A, the second autonomous travel work vehicle 1B and the third autonomous travel work vehicle 1C is equipped with the rotary tilling device 24 as the same work machine.

As shown in FIG. 10, the first autonomous travel work vehicle 1A, the second autonomous travel work vehicle 1B and the third autonomous travel work vehicle 1C are arranged shiftingly from the left front side (center of the field) to the aslant right rear side (corner of the field) in this order, and start the work one by one from a work start position at an edge of a ridge with predetermined intervals. The actual positions of the first autonomous travel work vehicle 1A, the second autonomous travel work vehicle 1B and the third autonomous travel work vehicle 1C are grasped by the satellite positioning system, transmitted via the transceivers 110 and 111 to the remote control apparatus 112, displayed on the set route R, and relative distances between the vehicles are calculated.

As shown in FIG. 10, in the case in which the three vehicles are aligned laterally and travel in parallel, when the vehicles reaches the edge of the field, the vehicles skip two rows and start next work. Accordingly, the work of the three rows is performed at once, whereby the work time can be shortened so as to improve the work efficiency. As the work of this case, tilling, weeding, mowing, harvest, spraying and the like can be performed.

Figure 11:
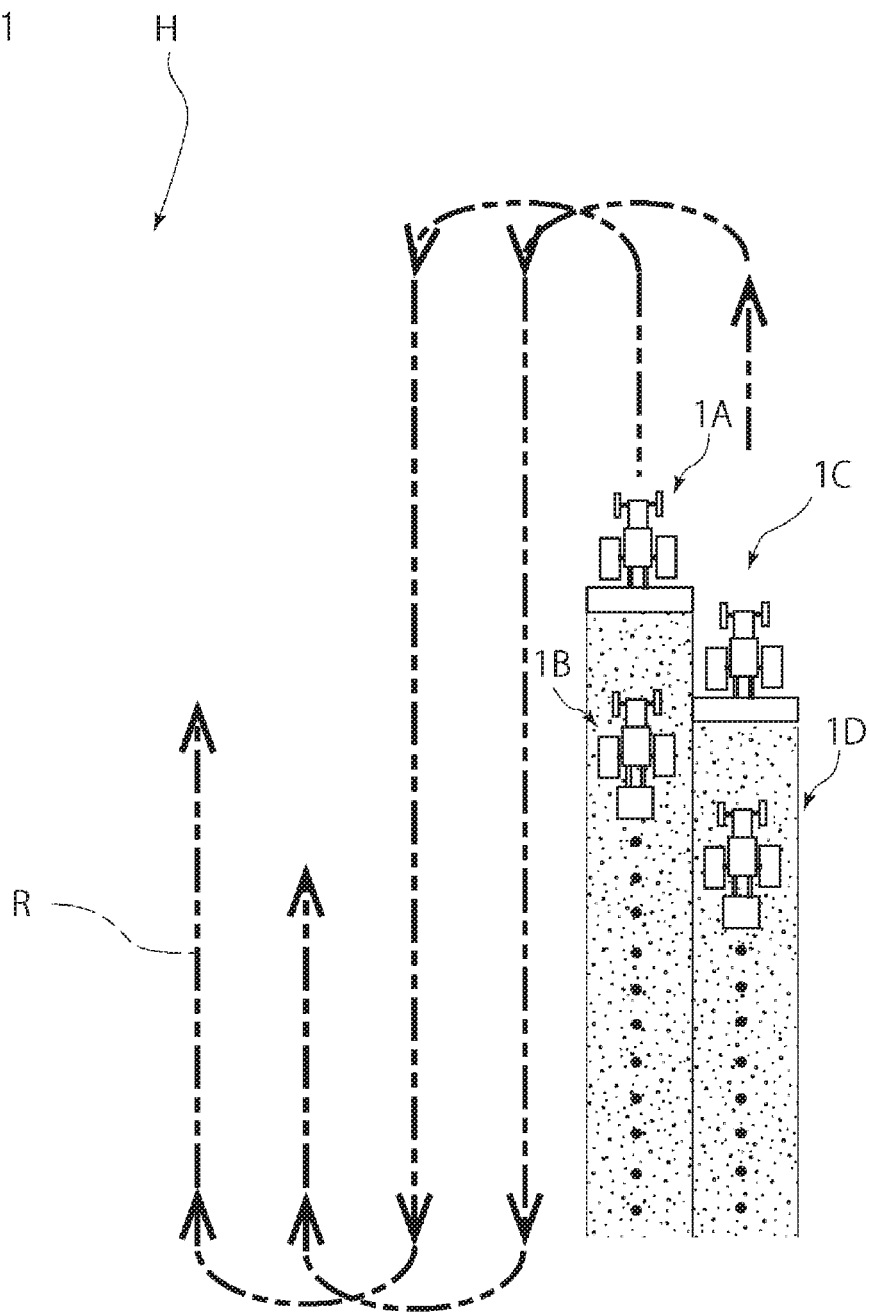
FIG. 11 is a drawing of a state in which work is performed by a pair of vehicles aligned longitudinally and vehicles traveling in parallel aslant concerning the pair.

As shown in FIG. 11, it may alternatively be configured that a pair of the first autonomous travel work vehicle 1A and the second autonomous travel work vehicle 1B and a pair of the third autonomous travel work vehicle 1C and a fourth autonomous travel work vehicle 1D, each of which is aligned longitudinally and works, travel in parallel laterally aslant and work. The precedence autonomous travel work vehicles 1A and 1C and the following autonomous travel work vehicle 1B and 1D respectively perform different works. For example, the precedence vehicles have the rotary tilling devices 24 and the following vehicles have the seeding machines, or the precedence vehicles have the rotary tilling devices and the following vehicles have the furrowers. In this case, since the work is performed in the two rows in parallel, the one row is skipped and the work is restarted at the time of turning at the butt.

In this work mode, the work speed of all the vehicles is set the same. However, because quality (viscosity, hardness, moisture difference and the like) of the soil of the field is difference, the type of the tractor is difference, or the type of the tractor is the same and an error peculiar to the vehicle exists, the distance between the vehicles may be extended or shortened following the work with long distance.

Accordingly, one of the plurality of autonomous travel work vehicles is regarded as a standard vehicle and the other vehicles are regarded as auxiliary vehicles. Each of the vehicles measures its position by the satellite positioning system so as to measure distance between the standard vehicle and the auxiliary vehicle. When the distance between the standard vehicle and the auxiliary vehicle is larger or smaller than a set range, the speed change means is controlled by the control device of the auxiliary vehicle and change travel speed of the auxiliary vehicle so as to make the distance within the set range. By regarding the autonomous travel work vehicle with the lowest work speed as the standard vehicle, the speed of the autonomous travel work vehicle with the low work speed is not raised so as to prevent the work from being rough.

In the work of FIG. 10, the first autonomous travel work vehicle 1A is regarded as the standard vehicle and the second autonomous travel work vehicle 1B and the third autonomous travel work vehicle 1C are regarded as the auxiliary vehicles. Relative distance is measured from a position of each vehicle. The distance between the second autonomous travel work vehicle 1B or the third autonomous travel work vehicle 1C and the first autonomous travel work vehicle 1A is extended when it is not more than the set distance and shortened when it is not less than the set distance. Concretely, when the distance between the second autonomous travel work vehicle 1B and the first autonomous travel work vehicle 1A is not more than the set distance, the speed change means 44 of the second autonomous travel work vehicle 1B is shifted to a low speed side, and when the distance is within the set distance, the second autonomous travel work vehicle 1B is controlled to be returned to the original speed. When the distance is not less than the set distance, the speed change means 44 of the second autonomous travel work vehicle 1B is shifted to a high speed side, and when the distance is within the set distance, the second autonomous travel work vehicle 1B is controlled to be returned to the original speed. The third autonomous travel work vehicle 1C is controlled similarly corresponding to the first autonomous travel work vehicle 1A.

It may alternatively be configured that the vehicle at a longitudinal center is regarded as the standard and speeds of the front and rear vehicles are changed so as to fix distances between the front and rear vehicles and the central vehicle (set distance). For example, when the distance between the first autonomous travel work vehicle and the second autonomous travel work vehicle is not less than the set distance, the speed of the first autonomous travel work vehicle is changed so as to make the distance within the set distance. When the distance between the second autonomous travel work vehicle and the third autonomous travel work vehicle is not less than the set distance, the speed of the third autonomous travel work vehicle is changed so as to make the distance within the set distance. Similarly, it may alternatively be configured that the vehicle at a longitudinal rear end is regarded as the standard and speed of the front vehicle is changed so as to make the mutual distance within the set distance. The speed change control thereof is performed similarly to the above. However, when the turn is performed at the butt, the control fixing the mutual distance is not performed.

When one of the first autonomous travel work vehicle, the second autonomous travel work vehicle and the third autonomous travel work vehicle become abnormal and stops at the time of the work, the other vehicles are stopped simultaneously. The abnormality requiring the stop is raise of temperature of cooling water or oil of the engine, abnormality of a fuel injection system, operation error of the work machine, short circuit or disconnection of an electric system, insufficiency of satellite positioning and the like.

For example, when the abnormality requiring the stop occurs in the second autonomous travel work vehicle, the speed change means 44 is shifted to neutral and the PTO switch 45 is disengaged. Otherwise, the engine 3 is stopped by the engine controller 60. Simultaneously, the speed change means 44 of each of the first autonomous travel work vehicle and the third autonomous travel work vehicle is shifted to neutral and the PTO switch 45 is disengaged. Otherwise, the engine 3 is stopped by the engine controller 60. Accordingly, the first autonomous travel work vehicle is prevented from being separated excessively from the second autonomous travel work vehicle and the third autonomous travel work vehicle is prevented from colliding with the second autonomous travel work vehicle. When the abnormality requiring the stop occurs in the first autonomous travel work vehicle 1A and the third autonomous travel work vehicle 1C, similar control is performed.

Figure 12:
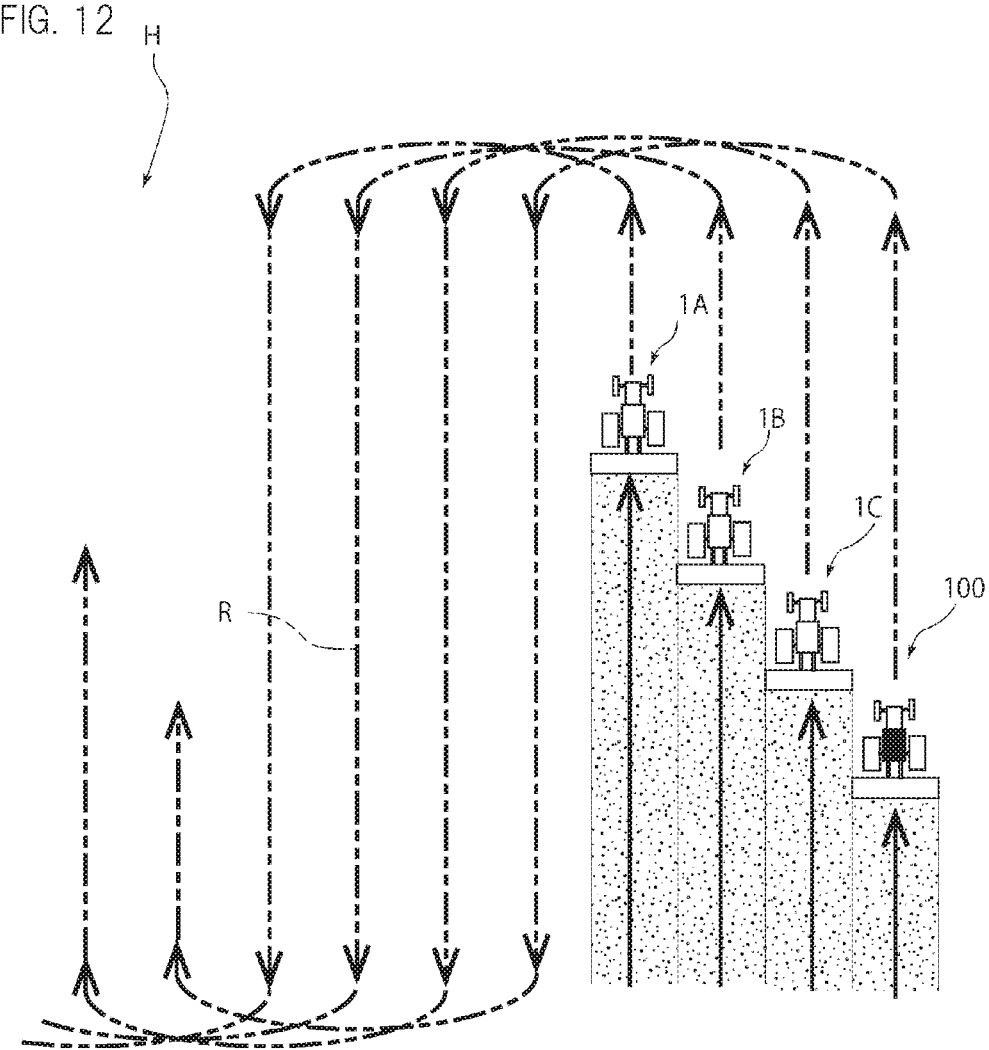
FIG. 12 is a drawing of a state in which work is performed by a plurality of autonomously moving work vehicles and a manned work vehicle traveling in parallel aslant.

It may alternatively be configured that the plurality of the autonomous travel work vehicles 1A, 1B, ... and a manned travel work vehicle 100, on which an operator having the remote control apparatus 112 rides, travel in parallel and work. For example, as shown in FIG. 12, the manned travel work vehicle 100 on which the operator rides is arranged behind the three autonomous travel work vehicles 1A, 1B and 1C arranged in parallel. The three autonomous travel work vehicles 1A, 1B and 1C travel automatically along the set travel route R and can be operated remotely by the remote control apparatus 112, and the manned travel work vehicle 100 is operated by the operator. The manned travel work vehicle 100 may alternatively be arranged before or between the autonomous travel work vehicles 1A, 1B and 1C. Since a basic configuration of the manned travel work vehicle 100 is substantially the same as the autonomous travel work vehicle 1, a detailed explanation thereof is omitted.

When the work vehicles travel in parallel in longitudinal and lateral directions as shown in FIG. 10, the manned travel work vehicle 100 may travel and work at head, tail end or a middle position.

As mentioned above, it may alternatively be configured that the optimum work speed and the optimum work drive value calculated from the past and current weather information (including weather report), the field information, the work information, the work machine information, and the farm product information are transmitted from the host computer 400 to the control device 30 of each of the three or more agricultural work vehicles including the first autonomous travel work vehicle 1A, the second autonomous travel work vehicle 1B and the third autonomous travel work vehicle 1C, and each of the first autonomous travel work vehicle 1A, the second autonomous travel work vehicle 1B and the third autonomous travel work vehicle 1C are controlled to work along the set travel route R at the optimum work speed and the optimum work drive value. For example, a detection value of work state of the precedence work vehicle is transmitted to the host computer 400, and the host computer 400 analyses the detection value and calculates an optimum value and transmits it to the precedence work vehicle and the following work vehicles so as to prevent control delay of the following work vehicles.

INDUSTRIAL APPLICABILITY

The present invention can be used for constructive work vehicles or agricultural work vehicles that a plurality of work vehicles work in a predetermined field with a satellite positioning system.

DESCRIPTION OF NOTATIONS 1 agricultural work vehicle
30 control device
40 steering actuator
44 speed change means
60 engine controller
112 remote control apparatus
400 host computer

The invention claimed is:
1. An agricultural work vehicle comprising
a transceiver configured to communicate with:
   a host computer having a storage device storing past weather information, field information, work information, work machine information, and farm product information; and
   a remote control apparatus configured to operate the agricultural work vehicle;
a position calculation means for measuring a position of the vehicle by a satellite positioning system,
a steering actuator configured to operate a steering device;
an engine controller configured to control an engine;
a speed change means for changing a speed of the agricultural work vehicle; and
a control device configured to:
   receive, from the host computer via the transceiver, a work speed and a work drive value determined from the past weather information and current weather information, the field information, the work information, the work machine information, and the farm product information, and
   control the position calculation means, the steering actuator, the engine controller, and the speed change means to enable the agricultural work vehicle to work along a set travel route at the work speed and the work drive value.

2. The agricultural work vehicle according to claim 1, wherein:
a slip rate is calculated from a set travel speed of the agricultural work vehicle along the set travel route,
a hardness of a field surface is determined based on an actual travel speed and a travel distance calculated based on information received from the satellite positioning system, and
the set travel speed is adjusted based on the hardness of the field surface.

3. The agricultural work vehicle according to claim 1, wherein:
the agricultural work vehicle is included in a plurality of agricultural work vehicles of a parallel travel work system in which the plurality of agricultural work vehicles travel in parallel and execute work,
each agricultural work vehicle of the plurality of agricultural work vehicles a corresponding control device and a corresponding transceiver configured to communicate with the same remote control apparatus, and
each agricultural work vehicle of the plurality of agricultural work vehicles is configured to be remotely operated by the same remote control apparatus.

4. The agricultural work vehicle according to claim 3, wherein, in response to an abnormality occurs in one of the plurality of agricultural work vehicles, each of the agricultural work vehicles of the plurality of agricultural work vehicles stops the work and travel.

5. The agricultural work vehicle according to claim 3, wherein:
one agricultural work vehicle of the plurality of agricultural work vehicles is regarded as a standard vehicle and another agricultural work vehicle of the plurality of agricultural work vehicles is regarded as an auxiliary vehicle,
wherein the auxiliary vehicle measures its position with the satellite positioning system and determines a distance between the standard vehicle and the auxiliary vehicles, and
wherein, when the distance between the standard vehicle and the auxiliary vehicles is shorter or longer than a set range, a speed change means is controlled by the control device of the auxiliary vehicle and a travel speed of the auxiliary vehicle is changed so as to make the distance within the set range.

6. The agricultural work vehicle according to claim 2, wherein a height of a work machine is compensated from the hardness of the field surface.

7. The agricultural work vehicle according to claim 1, wherein the work speed and the work drive value are determined based on a comparison between the current weather information and the past weather information.

8. The agricultural work vehicle according to claim 1, wherein the work speed comprises a travel speed of the agricultural work vehicle.

9. The agricultural work vehicle according to claim 1, wherein:
the agricultural work vehicle comprises a rotary tiller, and
the work drive value comprises a work height and a work depth.

10. The agricultural work vehicle according to claim 1, wherein:
the agricultural work vehicle comprises a seeding machine or a fertilizing machine, and
the work drive value comprises a feeding amount, a feeding interval, and a depth.

11. The agricultural work vehicle according to claim 1, wherein the work speed and the work drive value are further determined based on weather forecast information.

12. The agricultural work vehicle according to claim 11, wherein the weather forecast information comprises short-term weather forecast information or long-term weather forecast information.

13. The agricultural work vehicle according to claim 1, wherein the storage device of the host computer further stores the current weather information.

* * * * *